United States Patent [19]
Blow

[11] Patent Number: 5,757,912
[45] Date of Patent: May 26, 1998

[54] SYSTEM AND METHOD FOR QUANTUM CRYPTOGRAPHY

[75] Inventor: Keith James Blow, Suffolk, United Kingdom

[73] Assignee: British Telecommunications Public Limited Company, London, United Kingdom

[21] Appl. No.: 617,848
[22] PCT Filed: Sep. 8, 1994
[86] PCT No.: PCT/GB94/01954
 § 371 Date: Mar. 8, 1996
 § 102(e) Date: Mar. 8, 1996
[87] PCT Pub. No.: WO95/07584
 PCT Pub. Date: Mar. 16, 1995

[30] Foreign Application Priority Data

| Sep. 9, 1993 | [EP] | European Pat. Off. | 93307120 |
| Sep. 9, 1993 | [EP] | European Pat. Off. | 93307121 |
| Oct. 6, 1993 | [WO] | WIPO | PCT/GB93/02075 |
| Dec. 17, 1993 | [EP] | European Pat. Off. | 93310228 |
| Dec. 23, 1993 | [WO] | WIPO | PCT/GB93/02637 |

[51] Int. Cl.$^6$ ........................................... H04L 9/08
[52] U.S. Cl. ............................ 380/21; 359/112; 359/181
[58] Field of Search ........................... 380/21; 359/112, 359/181

[56] References Cited

U.S. PATENT DOCUMENTS

| 4,965,856 | 10/1990 | Swanic. | |
| 5,191,614 | 3/1993 | LeCong. | |
| 5,243,649 | 9/1993 | Franson | 380/9 |
| 5,307,410 | 4/1994 | Bennett | 380/21 |
| 5,311,592 | 5/1994 | Udd. | |
| 5,339,182 | 8/1994 | Kimble et al. | 359/112 |
| 5,418,905 | 5/1995 | Rarity et al. | 359/158 |
| 5,515,438 | 5/1996 | Bennett et al.. | |
| 5,675,648 | 10/1997 | Townsend. | |

OTHER PUBLICATIONS

C. H. Bennett; Physical Rev. Let.; vol. 68, No. 21, 25 May 1992, pp. 3121–3124.

IBM Technical Disclosure Bulletin; vol. 26, No. 8, Jan., 1984, pp. 4363–4366.

IBM Technical Disclosure Bulletin; vol. 28, No. 7, Dec., 1985, pp. 3153–3163.

*Primary Examiner*—Gilberto Barron, Jr.
*Attorney, Agent, or Firm*—Nixon & Vanderhye

[57] ABSTRACT

In a method of communication using quantum cryptography an encryption alphabet is used for coding signals for transmission on a quantum channel. The encryption alphabet comprises pairs of operators applied successively to single-photon signals transmitted onto the quantum channel with a predetermined delay between them. When the signals are detected the different signals of each pair are split according to their encoded state and directed to different detectors via paths giving a differential delay. The delay is substantially complementary to the original pre-determined delay. Coincidence detection is employed at the detectors to eliminate spurious detection counts.

19 Claims, 6 Drawing Sheets

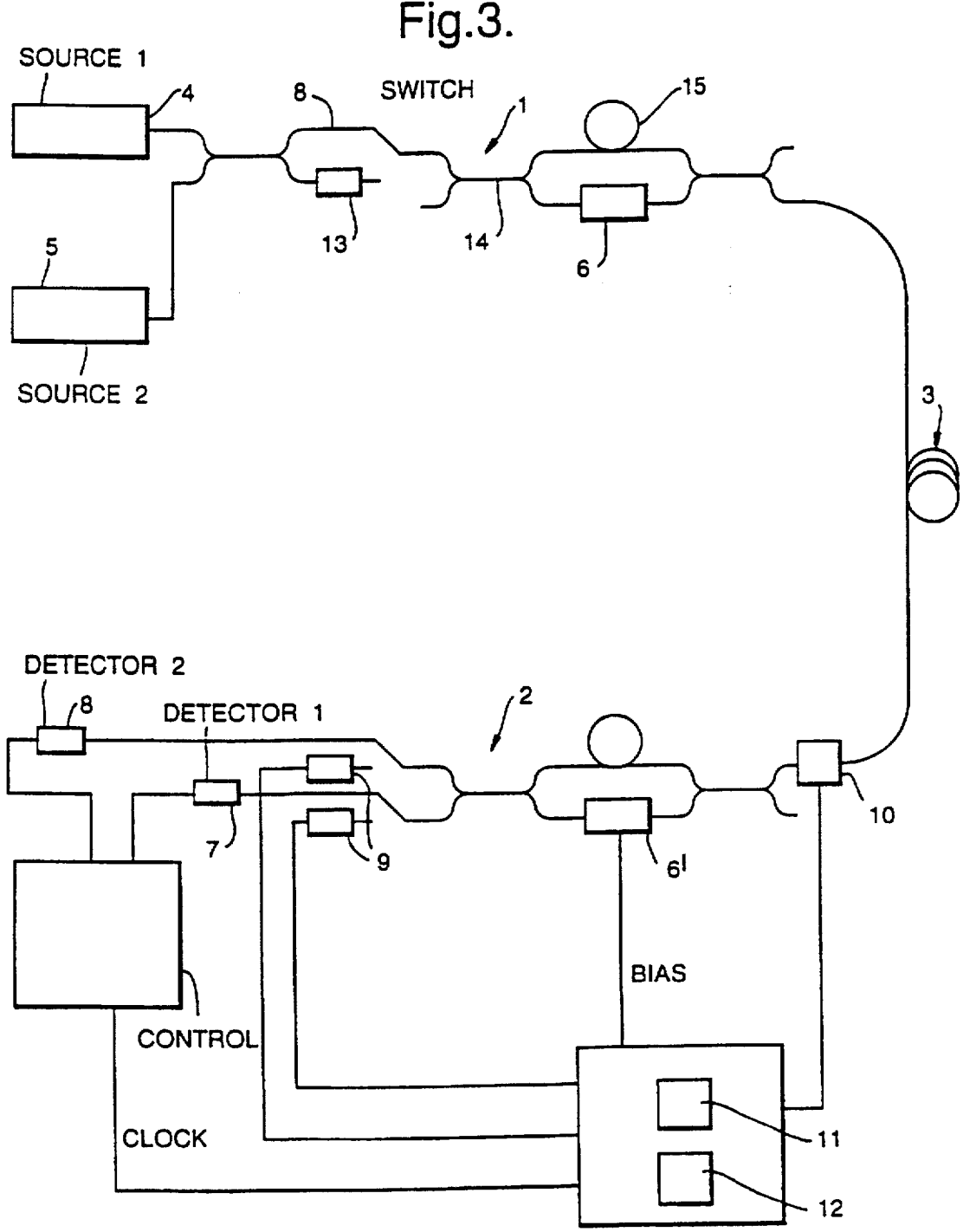

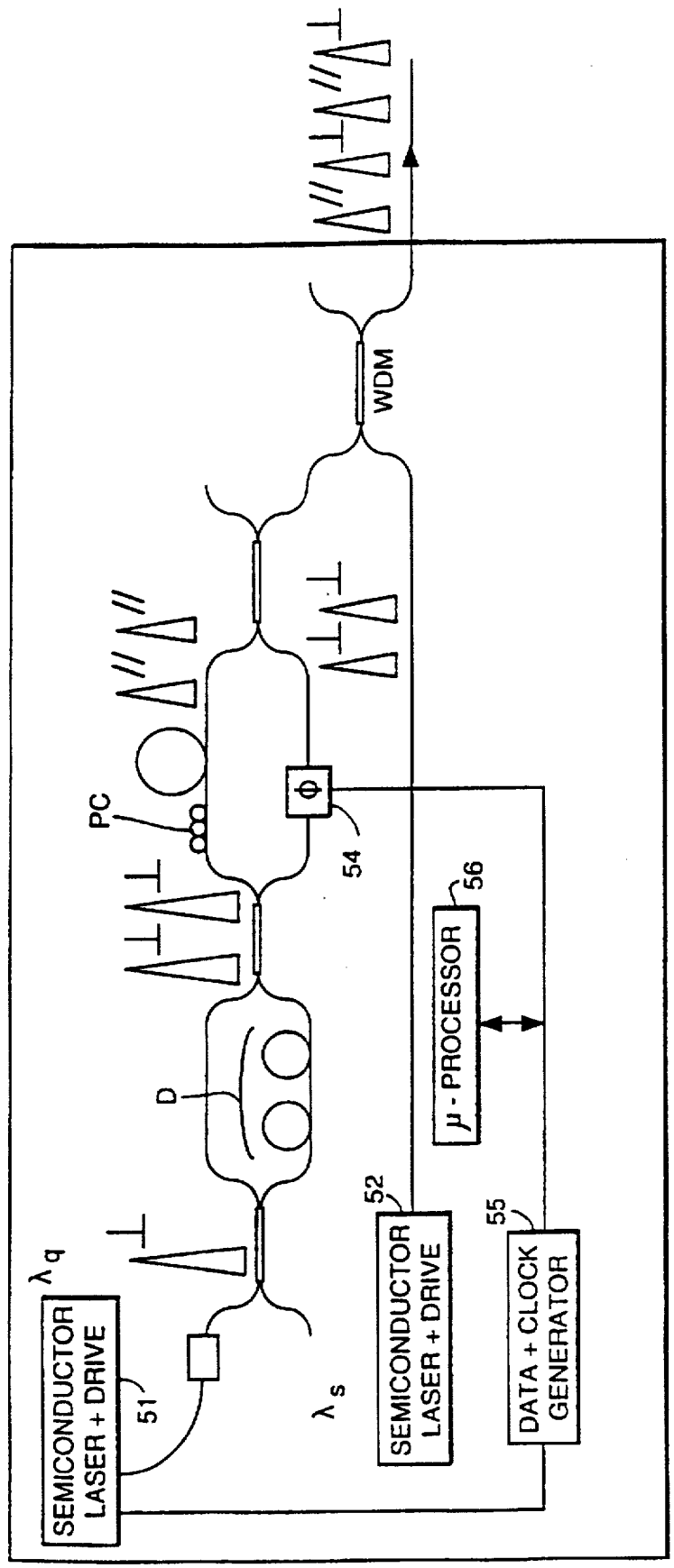

SYSTEM AND METHOD FOR QUANTUM CRYPTOGRAPHY

RELATED APPLICATIONS

This application is related to the following co-pending commonly assigned applications:

U.S. application Ser. No. 08/612,881, filed Apr. 22, 1996 entitled "METHOD FOR KEY DISTRIBUTION USING QUANTUM CRYPTOGRAPHY" naming Messrs. Phoenix and Barnett as inventors;

U.S. application Ser. No. 08/612,880, filed Mar. 8, 1996, entitled "SYSTEM AND METHOD FOR KEY DISTRIBUTION USING QUANTUM CRYPTOGRAPHY" naming Messrs. Townsend and Blow as inventors;

U.S. application Ser. No. 08/605,048, filed Mar. 7, 1996 entitled "KEY DISTRIBUTION IN A MULTIPLE ACCESS NETWORK USING QUANTUM CYPTOGRAPHY" naming Messrs. Townsend and Smith as inventors; and U.S. application Ser. No. 08/776,296, filed Jan. 30, 1997, entitled "QUANTUM CRYPTOGRAPHY" naming Mr. Townsend as the inventor.

This application is also related to U.S. Pat. No. 5,675,648, filed Aug. 15, 1995, issued Oct. 7, 1997, entitled "SYSTEM AND METHOD FOR KEY DISTRIBUTION USING QUANTUM CRYPTOGRAPHY" naming Mr. Townsend as the inventor.

BACKGROUND TO THE INVENTION

1. Field of the Invention

The present invention relates to a system for the communication of encrypted data and in particular to a system employing the technique known as quantum cryptography.

2. Related Art

In quantum cryptography data is encoded at the transmitter and decoded at the receiver using some specified algorithm which is assumed to be freely available to all users of the system, whether authorised or otherwise. The security of the system depends upon the key to the algorithm being available only to the authorised users. To this end, the key is distributed over a secure quantum channel, that is a channel carried by single-photon signals and exhibiting non-classical behaviour, as further discussed below. In the present specification, the term "single-photon" encompasses any signal having the required quantum properties. It may be generated from a highly attenuated source having in general no more than one and on average very much less than one photon per output signal, or may comprise single-photons generated by parametric down conversion. Both these techniques are described and claimed in our copending International application PCT/GB 93/02637 (WO 94/15422), the disclosures of which are incorporated herein by reference.

After the exchange of single-photon signals, the transmitter and the receiver then communicate over a separate channel, known as the public channel, to compare the transmitted and the received data. The presence of any eavesdropper intercepting the transmitted key results in a change in the statistics of the received data, which can be detected. Accordingly, in the absence of any such change in the statistics of the data, the key is known to be secure. The secret key thus established is used in the encryption and decryption of subsequent communications between the transmitter and receiver. The subsequent transmissions will generally, but not necessarily, be carried on the same transmission channel as was used for establishing the key. For added security, the existing key may periodically be replaced by a newly generated key.

In general, a method of communication using quantum cryptography includes the steps of:

(a) randomly selecting one of a plurality of coding alphabets corresponding to different non-commuting quantum mechanical operators and encoding a signal for transmission on the quantum channel using the selected operator;

(b) randomly selecting one of the different quantum mechanical operators and using that in detecting the signal transmitted in step (a);

(c) repeating steps (a) and (b) for each of a multiplicity of subsequent signals;

(d) communicating between the transmitter and the receiver independently of the encryption alphabets to determine for which of the transmitted signals common operators were selected by the transmitter and receiver;

(e) comparing the signals transmitted and received in steps (a) and (b) to detect any discrepancy resulting from the presence of an eavesdropper; and, (f) in the event that in step (e) no eavesdropper is detected, using at least some of the data transmitted in steps (a) and (b) as a key for encryption/decryption of subsequent data transmissions between the transmitter and receiver. This scheme is described in detail in C. H. Bennett, G. Brassard, S. Briedbart and S. Veesner in "Advances in Cryptology: proceedings with Crypto 82 (Pleenham, New York 1983); C. H. Bennett and G. Brassard, IBM Technical Disclosure Bulletin 28 3153 (1985).

In the term "encryption alphabet" as used herein, "encryption" refers to the coding of the single-photon pulses during the key distribution phase rather than to the subsequent encryption of text for transmission once a key has been established.

As described in our co-pending International filed this day entitled "QUANTUM CRYPTOGRAPHY ON A MULTIPLE ACCESS NETWORK" (agent's reference 80/4541/03), incorporated herein by reference, this basic quantum cryptographic technique may be extended for use in multiple-access networks. It may also be used in a configuration in which signals from the receiver are looped back to the transmitter and step of detecting using selected quantum mechanical operators is carried out there at the transmitter. This arrangement is described and claimed in our further co-pending International application also filed this day and entitled "QUANTUM CRYPTOGRAPHY" (agent's reference 80/4579/03), also incorporated herein by reference.

SUMMARY OF THE INVENTION

According to a first aspect of the present invention, a method of communication using quantum cryptography is characterised in that the encryption alphabet used in coding signals for transmission on a quantum channel comprises pairs of operators applied successively to single-photon signals transmitted onto the quantum channel with a predetermined delay between them, and in that in a step of detecting the single-photon signals, the different signals of each pair are split according to their encoded state and directed to different detectors via paths giving a differential delay substantially complementary to the said predetermined delay and coincidence detection is employed at the detectors to eliminate spurious counts.

The present invention provides a method of quantum cryptography which is far less sensitive to system noise, and in particular to the effects of dark counts in the detectors for the single-photon signals. This is achieved by encoding pairs (or larger groups) of single-photon signals and outputting them onto the transmission medium providing the quantum channel with a predetermined delay between them. Subsequently, the two single-photon signals are directed to different detectors depending on, for example, their encoded phase states. The path lengths to the different detectors differ by an amount providing a delay substantially complementary to the original predetermined delay between the first and second of the single-photon signals making up the pair. That is to say, the leading single-photon signal is directed to a detector via the longer path, while the lagging single-photon signal is directed to the other detector by a shorter path, so that appropriately encoded signals arrive substantially simultaneously at the respective detectors, which is to say any time difference is smaller than the coincidence window of the detector.

Dark counts are particularly a problem with APD's operating in the 1300 nm transmission window, and so the present invention is particularly advantageous when applied to such devices, or to other detectors where dark counts are a significant problem.

The operators applied to the single-photon signals may be phase operators or polarisation operators. Preferably each single-photon signal is split and passes through two paths, one only of the two paths including a phase or polarisation modulator, the signals from the two paths being recombined at the detector. A delay may be provided in one of the signal paths to separate the two paths in the time-domain.

The preferred implementations of the present invention use a Mach-Zehnder configuration to modulate the single-photon signals. This involves each single-photon signal passing through a beam splitter and then going through two branches, one only of which includes a modulator which applies a phase or polarisation shift relative to the other unmodulated path. A time delay may be introduced in one of the paths to keep the two branches separated in the time-domain while they are transmitted along a single transmission channel. This splitting of an individual single-photon signal and the use a time delay between the different branches of a Mach-Zehnder interferometer is known in the prior art and is described for example in our above-cited co-pending International application no. PCT/GB 93/02637 (WO 94/15422). This use of a time delay between different components of an individual single-photon signal and the application of a relative phase or polarisation shift in one of the branches is to be distinguished from the use of a time delay between different single-photon signals and the application of different operators to the different signals which is the subject of the present invention.

According to a second aspect of the present invention, there is provided a communications system including means for generating pairs of single-photon signals, means for applying pairs of operators successively to the single-photon signals and outputting them onto a quantum channel with a pre-determined delay between them, a pair of detectors connected to the quantum channel via paths giving a differential delay complementary to the said predetermined delay, means for splitting incoming single-photon signals according to their encoded states and directing them to the different detectors, and means for detecting the coincident arrival of signals at the detectors.

BRIEF DESCRIPTION OF THE DRAWINGS

Embodiments of the present invention will now be described in detail by way of example only with reference to the accompanying Figures in which;

FIG. 3 is a detailed circuit diagram of a system embodying the present invention;

FIGS. 5a and 5b are transmitter and detector stages respectively of a second embodiment;

DESCRIPTION OF EXEMPLARY EMBODIMENTS

Figure 1:
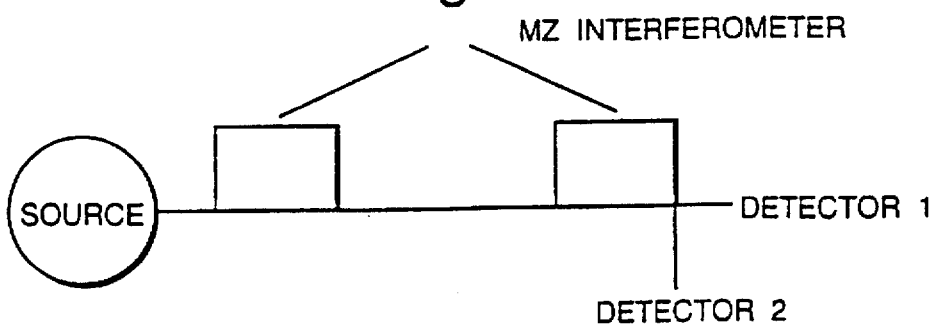
FIG. 1 is a schematic of a prior art quantum cryptography system.

FIG. 1a shows schematically a prior art quantum cryptography system. This uses at the transmitter a single source which may be, for example, a highly attenuated laser producing in general no more than one photon per output pulse. The single-photon signals from this source then pass through a 50:50 beam splitter. A modulator, which in the present example is a phase modulator, is included in one branch of the signal path. This may apply, for example, a $\pi$ phase shift relative to the other branch. Signals from the two branches are then output onto the transmission channel with a delay between them. At the detectors a complementary structure is used with a further beam splitter and a complementary delay in the other of the two branches so that the two components are recombined. A modulator is again provided in one of the branches at the detector and is used to determine the basis used for detection. The output of the system is encoded as a 1 or a 0 depending upon which of the two detectors receives the output pulse.

Figure 2:
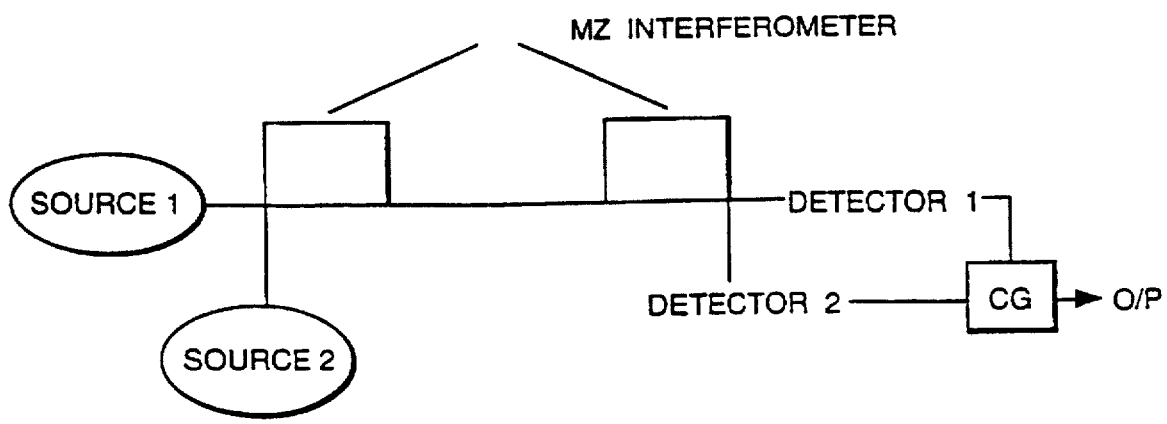
FIG. 2 is a schematic of a system embodying the present invention.

FIG. 2 shows a circuit embodying the present invention. Again at the detector a pair of detectors are used, but in addition a coincidence gate (CG) is connected to the output of the detectors. At the transmitter two single-photon sources are used: a first source coupled to the first beam splitter by a short transmission path, and a second source coupled to the other side of the beam splitter by a longer transmission path. As before, a modulator, in the present example a phase modulator, is coupled in one of the branches beyond the beam splitter. A complementary structure is used at the detectors, with the path difference between the two detectors arranged to be the same as the path difference between the sources.

A new protocol is adopted for use with this system.

First consider the propagation of an individual single-photon pulse through the system. Two phase changes are applied in the two half Mach-Zehnder interferometers at the transmitter and receiver respectively. If the total phase change is 0 or $\pi$ then the pulse will appear at one or other of the two detectors with unit probability. In other words, the phase change applied to a pulse can steer it to one or other of the detectors. As indicated above, in systems embodying the present invention, two single-photon pulses are used, one from each source. The relationship between the different path lengths at the sources and the detectors is such that we can obtain coincidence by arranging for a photon from source 1 to arrive at detector 2 and vice versa. Table 1 below lists the phase changes which can be used to guarantee coincidence. This table shows only the (0, $\pi$) basis, but we can add $\pi/2$ to each phase to obtain the ($\pi/2$, $3\pi/2$) basis. In the table "phase 1" and "phase 2" refers to the phases applied at the transmitter and receiver respectively.

Table 2 shows the pairs of phases applied to the two pulses as they pass through the system. Within the (0, $\pi$)

basis the transmitter may, for example use (0, π) to code for a 1, that is a phase change of 0 applied to the first pulse and a phase change of π applied to the second pulse; and a phase change of π followed by a phase change of 0 to encode for a "0". Then, for those received pulses for which the receiver measures in the same basis, if the receiver applies a phase change of π to the first incoming pulse and a phase change of 0 to the second incoming pulse then if a coincident output is obtained from the detectors it is known that the transmitter must have encoded with the sequence (0, π) i.e. has encoded a logical "1". Where a coincident output is obtained and the receiver has applied phase changes of (0, π) then the transmitter is assumed to have encoded the phase changes (π, 0) i.e. a logical "0".

The delay between the first and second single-photon pulses of each pair needs to be greater than the coincidence window of the coincidence detector employed at the receiver. In the present example, that detector has a coincidence window of 8 ns and so this sets a lower bound for the separation of the pulses. In practice, a separation between the pulses in the range 10–20 ns is used. The phase modulators are therefore required to be relatively high bandwidth devices capable of switching states on a comparably short time scale. In the embodiment described below, the phase modulator is a lithium niobate crystal. Alternatives are the use of a fibre modulator with the phase-modulation effected by XPM induced by a control beam switched into the fibre, or ferro-electric liquid crystal modulators may be used. A further alternative is the use of fast non-linear semiconductor devices.

After the quantum transmission has taken place, a public communication is performed as in conventional systems. Only those events where coincidence is obtained are considered, and the subset of events where the same basis was used at the source and the detector are used to establish a secure key. Any errors detected by a statistical test of this data subset would reveal the presence of an eavesdropper on the network. In the absence of any such errors, the transmitter and receiver can confidently use the remainder of the data as a shared secret key for subsequent encoded transmissions between themselves. Practical quantum channels, however, will suffer from unavoidable background error rates due to detector dark counts, and environmentally-induced fluctuations in the polarisation (or phase) state in the fibre etc. In this case the public discussion phase contains an additional stage of error correction and so-called "privacy amplification", as further discussed in our above-cited co-pending international application filed today (ref: 80/4541/03). This both ensures that the transmitter and receiver end up with identical keys and that any key information leaked to an eavesdropper is an arbitrarily small fraction of one bit. This procedure is outlined in C. H. Bennett, F. Bessette, G. Brassard, L. Salvail and J. Smolin: "Experimental Quantum Cryptography", J. Cryptology, 5, 3 (1992).

FIG. 3 shows in detail a fibre-base optical communications system embodying the present invention. The system comprises a transmitter 1, a receiver 2, and an optical transmission fibre 3 linking the transmitter to the receiver. The transmitter includes two optical sources 4, 5 each provided by a pulsed semiconductor laser. In the present example each laser is an Hitachi series HL1361 DFB laser diode operating at 5 mw optical power at 1290–1330 nm. The two lasers are driven in synchronism. The output pulses are connected to the transmission system via paths of different lengths so as to provide a predetermined delay between the pulses. When the system is used for quantum transmissions, an attenuator 13 is switched into the path of the pulses output from the lasers so as to reduce the intensity to a level where each pulse has an average no more than one photon. The attenuated pulses are then split at a fibre coupler 14 so as to pass through two branches one of which includes a fibre delay 15 and the other of which includes a phase modulator 6. As described above, the phase modulator is used to apply pairs of phase operators to the pairs of single-photon pulses from the sources using a randomly selected encoding basis. The resulting signals are coupled onto the transmission fibre 3 and from there to the receiver. At the receiver the pulses are again split between two paths one including a fibre delay and the other including a phase modulator. Signals from the two branches are then recombined and output to two single-photon detectors 7, 8. As with the laser sources, the detectors are connected to this system by paths of different lengths providing a delay complementary to that introduced at the source.

The detection circuits are shown in further detail in FIG. 4. Each detector is an avalanche photo diode biased beyond breakdown and operating in the Geiger mode with passive quenching, as discussed in P. D. Townsend, J. G. Rarity and P. R. Tapster, Electronics Letters, 29, 634 (1993). Silicon APDs such as the SPCM-100-PQ (GE Canada Electro Optics) can be used in 400–1060 nm wavelength range, while germanium or InGaAs devices such as MDL5102P or MDL5500P (NEC) can be used in the 1000–1550 nm range. A distinctive feature of the present inventions is that it makes operation at wavelengths around 1300 nm practical. At this wavelength, detectors of the type described above suffer relatively high dark count rates. However the present invention greatly reduces the loss of data from the dark count. Consider a detector with a dark count rate $\eta$ which is being used to count photons in a time interval $\tau$.

The number of dark counts in this interval is $\eta\tau$ and this number is less than unity. When two such detectors are used, the number of coincident counts is $(\eta\tau)^2$ which in general is significantly smaller than the number of counts at a single detector.

As an alternative to APD's, other single-photon detectors may be used, such as e.g., photomultiplier tubes (PMTs).

FIG. 5 shows the coincidence detection system in further detail. Electrical pulses from the two APDs are amplified and then passed through a discriminator. The discriminator rejects low level amplifier noise by generating an electrical pulse of definite height and width only when the amplified signals exceed a specified threshold level. The LeCroy 612A and 622 amplifier and discriminator modules would be suitable for this purpose. Processed pulses from the two detectors are used as inputs to the two input channels of a coincidence gate such as the LeCroy 622. When operating in the AND mode this module generates an output pulse only if pulses arrive at the two inputs within 8 ns of each other. The temporal width of the coincidence window means that the two pulse pairs in the fibre must be separated by greater than 8 ns in order to avoid spurious coincidence detections.

Figure 4A:
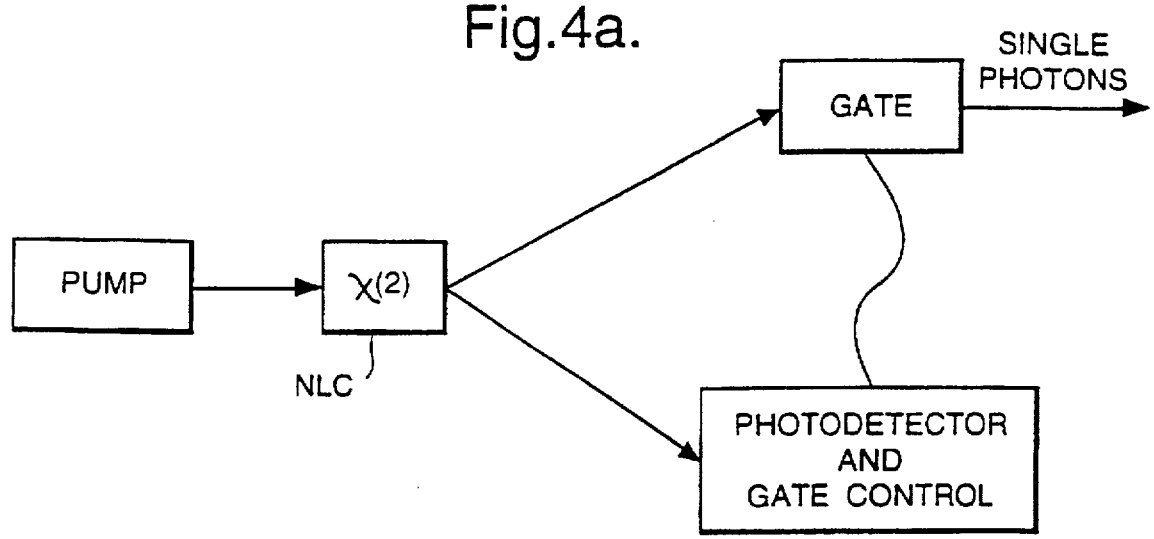
FIGS. 4a and 4b are single-photon sources using parametric down conversion.
Figure 4B:
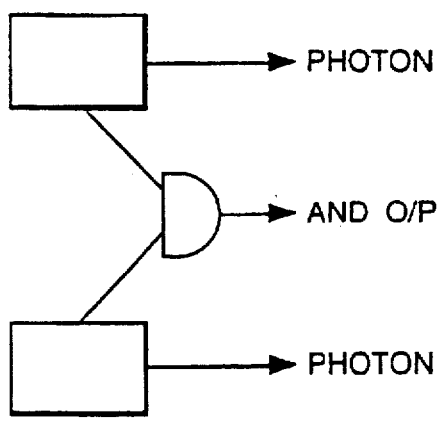

As an alternative to the use of attenuated semiconductor lasers, the two single-photon sources may be provided using parametric down conversion. A suitable source of this type is shown in FIG. 4a, using a non-linear crystal NLC formed from KDP. It is advantageous to use two such circuits driven in synchronism to provide the two sources. Then if the outputs of the two source photodetectors are ANDed together as shown in FIG. 4b, it can be determined when the required simultaneous output have been produced. The transmitter can then be arranged to store data, i.e. the record of the modulation basis and logical value encoded, only for those time slots in which a simultaneous output has occurred. This avoids the storing of redundant data.

As an alternative, a single down-conversion crystal may be used to provide both sources. In that case the photodetector and gate is eliminated from the circuit, and the two output branches from the crystal provide the two sources. With this arrangement, it is not known when simultaneous outputs have occurred, and so it is necessary to store data for every time slot.

The presently described example is arranged to carry out a calibration function as described in the present applicants co-pending British application no. 9226995.0. To this end, the transmitter is provided with an alternative output path from the semiconductor lasers which bypasses the attenuator. This produces a bright multi-photon signal which is transmitted across the network and is used both for calibration of the network initially, and also for the public discussion phase of the quantum cryptographic protocol. To receive the multi-photon pulses from the sources, a complementary standard detector 9 is provided in the receiver.

In use, any communication between the transmitter and the receiver is initialised by using the multi-photon signals to measure the output polarisation from the transmission fibre 3. A polarisation compensator 10 in the receiver 2 is then adjusted via a feedback loop in order to linearise the output polarisation and match it to the preferred polarisation axis of the receiver. For the case of phase encoding, the transmitter and receiver then use the multi-photon signals to calibrate the relative phase shift in their interferometer. This involves setting the AC drive voltages to the respective phase modulators 20 and using the feed back circuit to maximise the output from the interferometer output port by either changing the DC bias to the receiver's modulator, or via an additional phase-shifting component. This then completes the calibration of the system. The optical switches in the transmitter and receiver are then set to establish a quantum channel by connecting the low intensity source and the single-photon detectors respectively to the transmission fibre.

The calibration steps may be repeated intermittently as and when necessary.

The bright multi-photon source may also be used to communicate a system clock to the receiver for synchronisation of the transmitter and receiver time-slots. During this process, the output from the public channel detector is passed through an electronic filter 11 to provide an oscillating signal at the pulse repetition frequency. This is then used to lock a local oscillator 12 in the receiver to the optical source frequency. This local oscillator then provides the timing information required by the receiver during the quantum transmission stage of the protocol. Each time the transmission system is re-calibrated via the public channel the local oscillator may be re-timed so as to avoid the accumulation of any timing errors.

The quantum key distribution channel is arranged to operate independently of other transmission channels which pass between the transmitter and receiver carrying either the encrypted data or standard (non-encrypted) signals. This is important since the quantum channel operates in a non-continuous burst transmission mode, whereas in general the data channels will be required to provide uninterrupted continuous transmission. The required separation of the quantum channel may be provided through use of a reserved wavelength, different from that used by the data channels. In this case the quantum channel could be isolated by means of wavelength-sensitive passive optical components such as WDM couplers (e.g. Scifam Fibre Optics P2SWM13/15B) and filters (e.g. JDS TB1300A). The quantum channel may lie within the 1300 nm telecommunication window along with several other channels reserved for conventional signal traffic. Alternatively the 850 nm window is reserved for the quantum channel. This has the advantage that single-photon detectors for this wavelength (Silicon APDs) are relatively insensitive to 1300 nm light and therefore isolation from the data channels is easier to achieve. This approach would require WDM couplers such as the JDS WD813 to combine and separate the quantum and conventional channels. Alternatively the 1500 nm band might be used for conventional signal traffic while the 1300 nm band is reserved for the quantum channel. Since, the sensitivity of germanium APDs is high at 1300 nm and falls rapidly for wavelengths longer than about 1400 nm, these detectors would be an attractive choice for this particular wavelength division scheme. The wavelength separation technique would also allow active components such as optical amplifiers (e.g. erbium or praseodymium rare-earth-doped fibre amplifiers) to be used at the data channel wavelengths, whilst operating the quantum channel at a wavelength outside the spontaneous emission spectrum of the amplifier. If this were not the case, the spontaneously generated photons from the amplifier would easily saturate the detectors on the quantum channel.

Alternatively, it is possible to operate the quantum and data channels at the same wavelength, and achieve isolation by means of polarisation- or time-division multiplexing. The former case uses phase-encoding for the quantum channel, as described, e.g., in our co-pending International application PCT/GB 93/02637. The data channel operates on the orthogonal polarisation mode of the fibre, with isolation obtained by means of polarisation splitting couplers such as the JDS PB 100. In the time-division scheme, certain time slots are reserved for multi-photon data pulses which are detected by standard receivers linked to the network via standard fibre couplers. Saturation of the single-photon detectors during these time slots could be prevented either by means of switchable attenuators (intensity modulators) or by turning off the reverse bias to the devices. Any of these isolation techniques may also be employed to send the system timing information concurrently with the quantum key data. This approach may be useful if, for example, the timing jitter on the receiver local oscillators is too large to maintain system synchronisation over the timescale required for the quantum transmission. A further alternative technique provides the timing data concurrently with the quantum transmission using the same wavelength as the quantum channel. The receiver now contains, in addition, a standard detector such as a sensitive PIN-FET that is connected to the transmission fibre by a weak fibre tap that splits off e.g. −10% of the incoming pulse intensity. The intensity of every n-th pulse is made sufficiently large, say $10^5$ photons, that the standard detector registers a pulse which can be used for timing purposes. If n is sufficiently large, e.g. 1000, the APDs will not suffer from heating effects or saturation, and a ×1000 frequency multiplier can be used in the receiver to generate a local oscillator at the clock frequency.

Although the embodiment of FIG. 3 uses a simple point-to-point configuration, it will be appreciated that the present invention can be used with a wide range of different system topologies. These include multiple-access networks having, for example, star, tree or ring configurations and may include a looped-back path from the receiver to the transmitter as described in our above-cited co-pending European applications. As described in those applications, the transmitter may output un-modulated signals which are modulated at the receiver and returned to the transmitter.

Figure 5B:
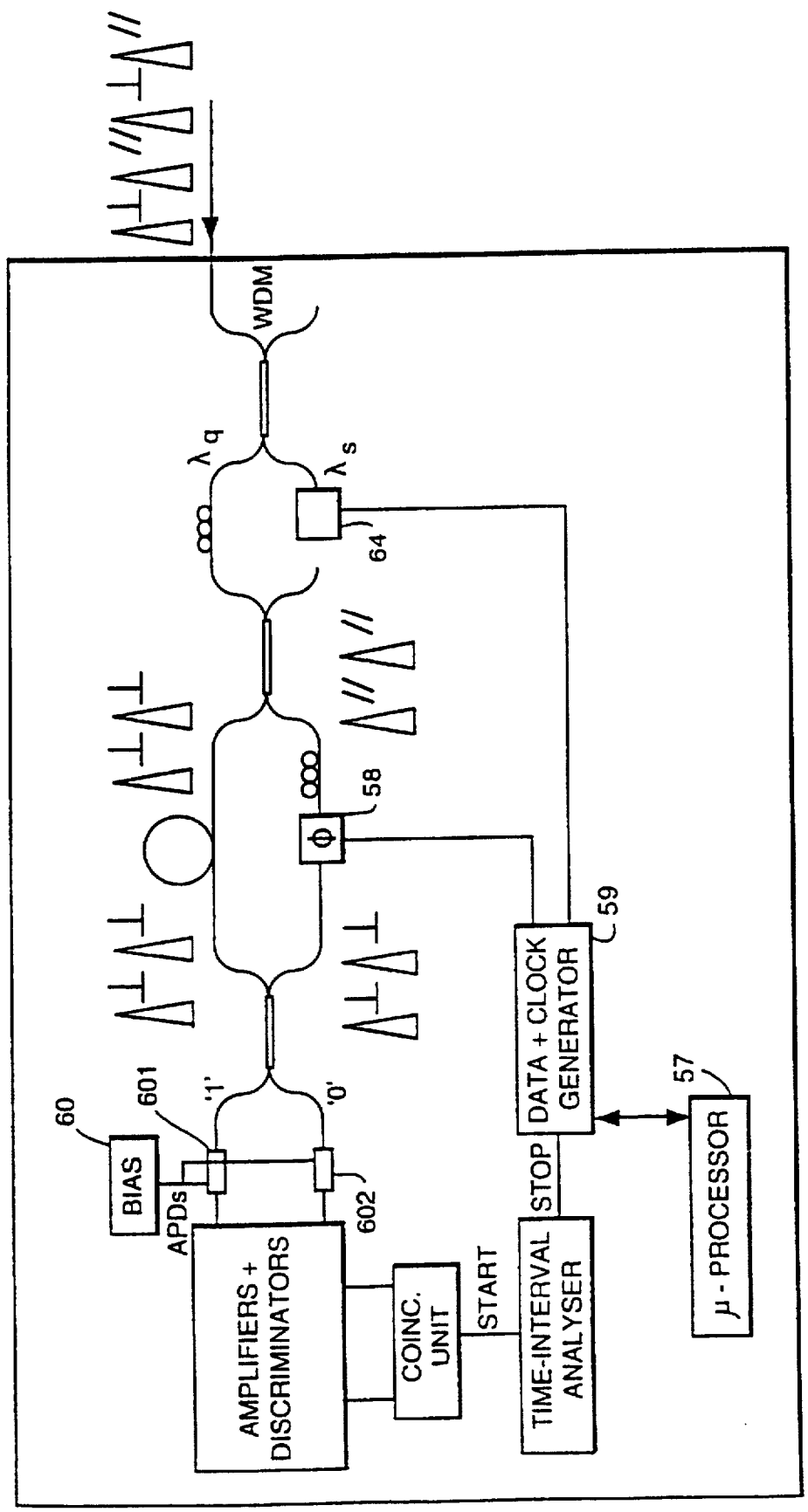
Figure 6:
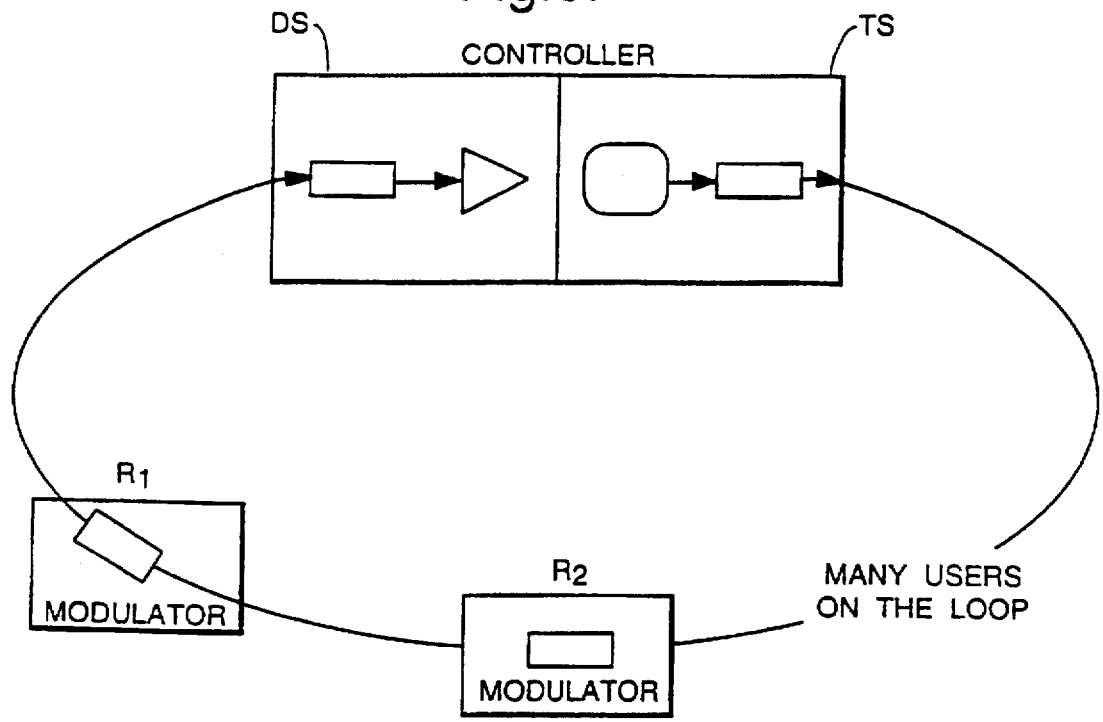
FIG. 6 is a schematic of the second embodiment.
Figure 7:
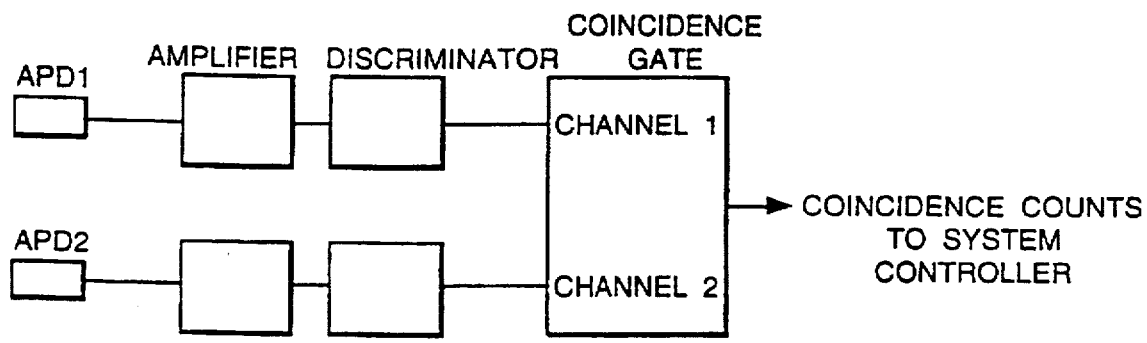
FIG. 7 is a coincidence detection system.

FIG. 6 shows a further embodiment using a multiple access network connecting a plurality of receivers R1,R2 ... to a transmitter in the form of a "controller" including both a transmit stage TS and a detector stage DS. FIGS. 5a and 5b show in detail the transmitter and detector stages respectively. In the transmitter output stage of this embodiment, a first pulsed semiconductor laser 51, operating at a first wavelength $\lambda_q$, where, e.g., $\lambda_q$=1300 nm provides the optical source for the quantum channel. The laser and a modulator driver 55 for a phase modulator 54 are controlled by a microprocessor 56. The phase modulator 54 is located in one branch of the transmitter. A polarisation controller PC (e.g. BT&D/HP MCP1000) is located in the other branch of the transmitter. A second semiconductor laser 52 provides a bright multi-photon source at a wavelength $\lambda_S$ where, e.g., $\lambda S$=1560 nm. This signal is used for timing and calibration as described above. The signal at $\lambda_S$ is coupled to the output of the transmitter via a WDM coupler 57 which may be, e.g. a JDS WD1315 series device.

As an alternative to the use of separate sources for the quantum channel and the timing signal, a single semiconductor laser may be used feeding its output via a fused fibre coupler FC to two different branches, one including an attenuator, and the other branch being unattenuated, as in the previous embodiments discussed above. An optical switch may then be used to select either the bright or attenuated output. Depending upon the frequency requirement, either a slow electromechanical device such as the JDS Fitel SW12 or a fast electro-optic device such as the United Technologies Photonics YBBM could be used.

In the receiver of this embodiment, a respective control microprocessor 57 controls the receiver phase modulator 58 via a modulator driver 59. The receiver control processor also controls a detector bias supply 60 for the a pair of single-photon detectors 601, 602. In both the transmitter and the receiver, where the signal path branches, fused-fibre 50/50 couplers are used. Suitable couplers are available commercially from SIFAM as model P22S13AA50. The timing signal at $\lambda_S$ is detected by a PIN-FET receiver 64.

Appropriate phase modulators 54, 58 for the data encoding and decoding are lithium niobate or semiconductor phase modulators operating at, e.g., 1–10 MHZ. An appropriate lithium niobate device is available commercially as IOC PM1300. An appropriate driver for the phase modulators is a Tektronix AWG2020, and this can also be used as a clock generator for the system. For the single-photon detectors, APDs as discussed above with reference to FIG. 3 may be used. Significant improvements could be obtained by combining the phase modulators and fibre devices shown in FIGS. 5a and 5b into single integrated structures. Variations on the current design or that discussed in P. D. Townsend, J. G. rarity and P. R. Tapster, Elect. Lett. 29, 634 (1993) could be integrated onto a lithium niobate chip with the fibre paths replaced by waveguides and the modulator region defined by electrodes as in a standard device. Alternative fabrication methods include e.g. photo-refractively-defined planar silica waveguide structures or semiconductor waveguide structures. In general, integration should lead to improved stability and compactness for the transmitter and receiver structures. In particular, this embodiment uses an NEC 5103 Ge APD cooled to 77K using, e.g., Hughes 7060H cryo-cooler or a liquid nitrogen dewar or cryostat. In the transmitter in this embodiment, just a single source is used for the quantum channel, with the delay between the pair of pulses being provided by a delay loop D in one of a pair of branches connected to the source.

The key distribution protocol requires each pair of received photons to be associated with a given clock period and also identified as a 0 or 1 depending the results of the conincidence detection and the state of the modulator, as described above. These functions are performed by a time interval analyser 62 (e.g. Hewlett-Packard 53110A). The start signals for this device are provided by the APD output after processing by amplifiers, discriminators and a coincidence gate as already detailed.

The timing signal referred to above may take the form of either a single trigger pulse, which is then used to initiate a burst of key data on the quantum channel, or as a continuous stream of pulses at the system clock frequency which are used to re-time the receiver clock between key transmissions. Before key transmission commences, the receiver varies the phase modulator DC bias level in order to zero the phase shift in the interferometer (i.e. photon transmission probability is maximised at one output port and minimised at the other). FIGS. 5a and 5b also show the relative spatial, temporal and polarisation changes experienced by the two components of a quantum channel pulse as they propagate through the transmitter and receiver. If all fibres in the system are polarisation-preserving then no active polarisation control or static polarisation controllers are required in the system. However if standard fibre is used for the transmission link then active polarisation control will be required at the input to the receiver. This can be performed using a standard detector, feedback circuit and automated polarisation control as described in our co-pending International application PCT/GB93/02637 (WO94/15422).

The present invention may be implemented on a network in which one or more receivers modulate a received single photon signal and return it to the transmitter where single photon detection takes place. Such networks are described in PCT/GB 93/02637. A possible attack upon such an implementation requires Eve (the eavesdropper) to intercept the quantum channel on both sides of a given user Bob. Then by transmitting and detecting a multi-photon signal Eve can determine unambiguously the state of Bob's modulator. Again in practice it is likely to be very difficult for Eve to establish connections to two or more points in the network. Nonetheless, where it desired to protect against an attack of the type described this may be done by providing at least one of the receivers on the network with a photon detector connected to the network by a relatively weak tap. This photon detector need not be of the sensitivity of the single photon detectors employed conventionally in receivers, nor need every user have such a detector. The presence of such a detector in the network facilitates the detection of any multi-photon probe used by Eve.

In embodiments using a multiple access loop, at the end of the public discussion phase the transmitter has established a distinct sequence of r secret bits with each ith terminal $R_i$ on the network. These secret bits can be used both for authentication and the generation of a respective shared key $K_i$, as described for the standard point-to-point application in C. H. Bennett, F. Bessette, G. Brassard, L. Salvail and J. Smolin: J. Crypt., 5, 3 (1992) and Bennett/Brassard IBM Tech. Discl. (already referenced above). If required, the controller/transmitter can then use the individual $K_i$ as keys in one-time pad encryptions of a master network key or keys. The latter can then be securely distributed to all receivers/terminals, or subsets of terminals, on the network. Consequently, two types of encrypted communication are enabled. In one-to-one communications the controller and $R_i$ use $K_i$ to encrypt the multi-photon data signals that are broadcast in either direction on the network. Hence, although these signals are broadcast on the network and are therefore accessible to all receivers, only $R_i$ and the controller can decode these particular data transmissions. In this scenario secure inter-terminal communications can still take place between e.g. $R_i$ and $R_j$, however the controller must act as an interpreter using its knowledge of $K_i$ and $K_j$ to decode and encode the incoming and outgoing signals. Any-to-any communications can also take place among subsets of terminals sharing a master key, and in this case, if a transmission path goes via the controller, the controller only needs to perform routing or re-transmission of the incoming encoded data. A fresh key may be transmitted periodically, to maintain security.

While this invention has been described in conjunction with specific embodiments thereof, it is evident that many alternatives, modifications and variations will be apparent to those skilled in the art. Accordingly, the preferred embodiments of the invention, as set forth herein, are intended to be illustrative, not limiting. Various changes may be made without departing from the true spirit and full scope of the invention, as defined in the following claims.

TABLE 1

| From | Phase 1 | Phase 2 | To |
|---|---|---|---|
| Source 1 | 0 | π | Detector 2 |
| Source 1 | π | 0 | Detector 2 |
| Source 2 | 0 | π | Detector 1 |
| Source 2 | π | 0 | Detector 1 |

TABLE 2

| Phase 1 | Phase 2 |
|---|---|
| (0,π) | (π,0) |
| (π,0) | (0,π) |
| (π/2,3π/2) | (π/2,3π/2) |
| (3π/2,π/2) | (3π/2,π/2) |

I claim:

1. A method of communication using quantum cryptography comprising the steps of:
   coding signals for transmission on a quantum channel using an encryption alphabet said encryption alphabet comprising pairs of operators applied successively to single-photon signals transmitted onto said quantum channel with a predetermined delay between said single-photon signals;
   detecting the single-photon signals, wherein different signals of each pair are split according to their encoded state and directed to different detectors via paths providing a differential delay substantially complementary to the said predetermined delay;
   detecting coincidence to eliminate spurious counts.

2. A method of communication using quantum cryptography, comprising the steps of:
   coding signals for transmission on a quantum channel using an encryption alphabet, said encryption alphabet comprising pairs of operators applied successively to single-photon signals transmitted onto said quantum channel with a predetermined delay between said single-photon signals,
   detecting the single-photon signals, wherein different signals of each pair are split according to their encoded state and directed to different detectors via paths providing a differential delay substantially complementary to said predetermined delay; and
   detecting coincidence to eliminate spurious counts,
   wherein the step of coding each single-photon signal comprises, splitting the single-photon signal between two paths, only one of the two paths including a phase polarization modulator, and recombining the signals from the two paths before the step of detecting the single-photon signals.

3. The method according to claim 2, further comprising providing a delay in one of the two paths to separate the two paths in the time-domain.

4. The method according to claim 1, further comprising a step of decoding the single-photon signals, said decoding step including randomly selecting a detection basis;
   applying a first operator to a first incoming photon of the pair, and a second operator, different from said first operator, to a second incoming photon of the pair, or applying the second operator to the first photon and the first operator to the second photon; and
   detecting the signal as logical 1 or logical 0, when a coincident output is obtained, according to which of the sequences of operators was selected.

5. The method according to claim 1, wherein the single-photon signals are at a wavelength in the region of 1300 nm.

6. A communications system, comprising:
   means for generating pairs of single-photon signals;
   means for applying pairs of operators successively to the single-photon signals and outputting them onto a quantum channel with a predetermined delay between them;
   a pair of detectors connected to the quantum channel via paths providing a differential delay complementary to the said predetermined delay;
   means for splitting incoming single-photon signals according to their encoded states and directing them to the different detectors; and
   means for detecting coincident arrival of signals at the detectors.

7. The system according to claim 6, wherein the means for generating pairs of single-photon signals, comprises:
   a pair of optical sources connected to the quantum channel by different paths, said different paths providing the predetermined differential delay.

8. The system according to claim 7, further comprising:
   means for detecting when coincident outputs are produced by the pair of sources.

9. The system according to claim 8, wherein the optical sources comprise a pair of parametric down conversion sources, each of the sources including a detector in one of its output branches, the output of the two detectors in the respective sources being ANDed to generate a signal indicating coincident output from the two sources.

10. The system according to claim 6, wherein said detectors are avalanche photo-diodes.

11. The system according to claim 6, wherein said means for detecting coincident arrival comprises a coincidence gate connected to the different detectors.

12. A system according to claim 6, in which the quantum channel is carried on a multiple access network.

13. A quantum cryptographic communications system, comprising:
   a pair of optical sources, said optical sources generating pairs of single-photon signals;
   a modulator applying pairs of operators successively to said single-photon signals and outputting said signals onto a quantum channel with a predetermined delay interposed between said signals;

a pair of detectors connected to said quantum channel by optical paths having a differential delay complementary to said predetermined delay;

a splitter connected to said quantum channel, said splitter splitting incoming signals based on an encoded state of said signals and directing said signals to different ones of said pair of detectors; and a detector connected to said pair of detectors for detecting coincident arrival of signals at said pair of detectors.

14. The communication system according to claim 13, wherein said optical sources comprise parametric down conversion sources, each source including a detector in an output branch of said source, an output of each detector being connected to an AND gate, an output of said AND gate indicating coincident output from said sources.

15. The communication system according to claim 13, wherein said modulator comprises one of a phase modulator and a polarization modulator.

16. A quantum cryptographic communication system, comprising:

a pair of optical sources generating pairs of single-photon signals;

a modulator operatively coupled to said sources and applying pairs of operators to said single-photon signals, said modulator outputting said signals on a quantum channel with a predetermined delay interposed between said signals; and a coincident detector operatively coupled to said quantum channel for detecting coincident arrival of said signals.

17. The communication system according to claim 16, further comprising:

a pair of detectors connected to said quantum channel by optical paths having a differential delay, said differential delay being complementary to said predetermined delay.

18. The communication system according to claim 16, wherein said optical sources comprise parametric down conversion sources, each source including a detector in an output branch of said source, an output of each said detector being logically ANDed to indicate coincident output from said sources.

19. The communication system according to claim 16, wherein said modulator is one of a phase modulator and a polarization modulator.

* * * * *